(12) United States Patent
Back et al.

(10) Patent No.: US 10,179,536 B2
(45) Date of Patent: Jan. 15, 2019

(54) ILLUMINATION APPARATUS

(71) Applicant: Uber Technologies, Inc., San Francisco, CA (US)

(72) Inventors: Tyler Jon Back, San Francisco, CA (US); Irving Hu, San Francisco, CA (US); Darin Smedberg, San Francisco, CA (US); James Matthew Collins, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 403 days.

(21) Appl. No.: 14/839,745

(22) Filed: Aug. 28, 2015

(65) Prior Publication Data

US 2017/0059134 A1    Mar. 2, 2017

(51) Int. Cl.
| | | |
|---|---|---|
| *F21V 15/01* | (2006.01) | |
| *F21S 4/22* | (2016.01) | |
| *B60Q 1/26* | (2006.01) | |
| *F21S 4/20* | (2016.01) | |
| *F21S 4/26* | (2016.01) | |
| *F21S 4/28* | (2016.01) | |

(52) U.S. Cl.
CPC ............. *B60Q 1/268* (2013.01); *F21S 4/20* (2016.01); *F21S 4/22* (2016.01); *F21S 4/26* (2016.01); *F21S 4/28* (2016.01); *F21V 15/01* (2013.01); *F21V 15/012* (2013.01); *F21V 15/013* (2013.01)

(58) Field of Classification Search
CPC ....... B60Q 1/268; F21V 15/01; F21V 15/012; F21V 15/013; F21S 4/20; F21S 4/22; F21S 4/26; F21S 4/28
See application file for complete search history.

(56) References Cited

U.S. PATENT DOCUMENTS

| 6,028,537 A | 2/2000 | Suman |
|---|---|---|
| 8,646,194 B2 | 2/2014 | Podd |
| 2002/0125839 A1* | 9/2002 | Yen .......................... F21K 9/00 315/291 |

(Continued)

FOREIGN PATENT DOCUMENTS

| CN | 201918124 | 8/2011 |
|---|---|---|
| CN | 202213529 | 5/2012 |

(Continued)

OTHER PUBLICATIONS

International Search Report dated May 13, 2015.

(Continued)

*Primary Examiner* — Anh Mai
*Assistant Examiner* — Nathaniel Lee
(74) *Attorney, Agent, or Firm* — Mahamedi IP Law LLP

(57) ABSTRACT

An illumination apparatus is described that includes a set of illumination components. The illumination apparatus also includes a housing structure having an overall width and an overall length. The housing structure includes a cavity to house the set of illumination components, which is defined by, at least, a first lateral wall of the housing structure and a second lateral wall of the housing structure that each extends along the overall length, and a base of the housing structure. The housing structure includes a set of openings on the base, where each opening extends from the first lateral wall to the second lateral wall.

19 Claims, 7 Drawing Sheets

(56) References Cited

U.S. PATENT DOCUMENTS

| | | |
|---|---|---|
| 2005/0227704 A1 | 10/2005 | Ferra |
| 2007/0183156 A1 | 8/2007 | Shan |
| 2008/0298058 A1* | 12/2008 | Kan ................... F21V 15/01 362/240 |
| 2009/0192851 A1 | 7/2009 | Bishop |
| 2011/0102165 A1 | 5/2011 | Rahamim |
| 2012/0092194 A1 | 4/2012 | Crucs |
| 2012/0137256 A1 | 5/2012 | Lalancette |
| 2012/0203599 A1 | 8/2012 | Choi et al. |
| 2013/0150004 A1 | 6/2013 | Rosen |
| 2014/0081764 A1 | 3/2014 | James |
| 2014/0130387 A1 | 5/2014 | Pod |
| 2014/0223787 A1 | 8/2014 | Richmond |
| 2015/0317568 A1 | 11/2015 | Grasso |
| 2015/0345743 A1* | 12/2015 | Trincia ................. F21V 7/0091 362/223 |
| 2016/0378303 A1 | 12/2016 | Crilley |

FOREIGN PATENT DOCUMENTS

| | | |
|---|---|---|
| GB | 2473831 | 3/2011 |
| JP | 1992027220 | 5/1990 |
| JP | 2000082199 | 3/2000 |
| JP | 2012088925 | 5/2012 |
| KR | 10-2012-0090480 | 8/2012 |

OTHER PUBLICATIONS

Office Action dated Feb. 8, 2017 in Canadian App. No. 2,948,472.
Office Action dated Mar. 3, 2017 in Australian App. No. 2015259802.
Examination Report dated Oct. 12, 2017 in Australian App. No. 2017206210.

Office Action dated Dec. 19, 2017 in Chinese Application No. 201508831578.6.

Office Action dated Feb. 15, 2018 in Australian Application No. 2017265095.

Office Action dated Apr. 17, 2018 in Japanese Application No. 2016567642.

Office Action dated Jul. 3, 2018 in EP 15792139.6.

* cited by examiner

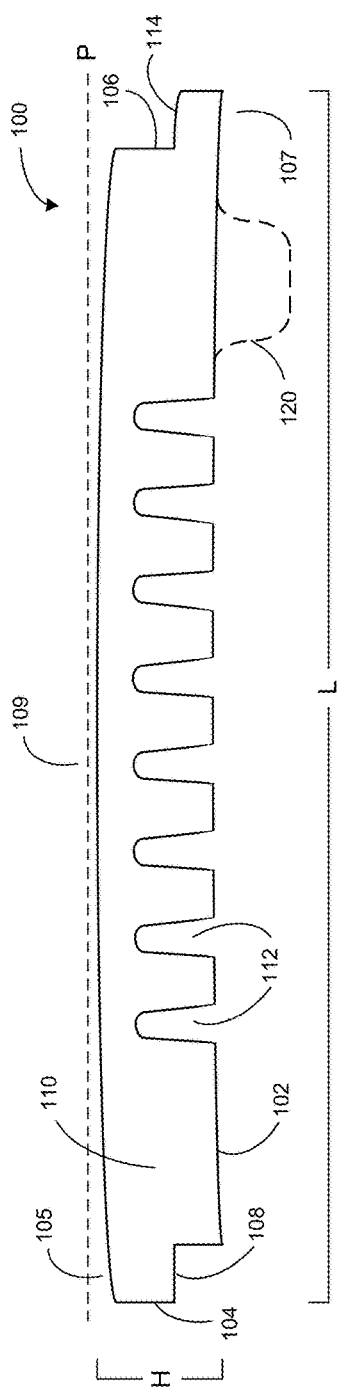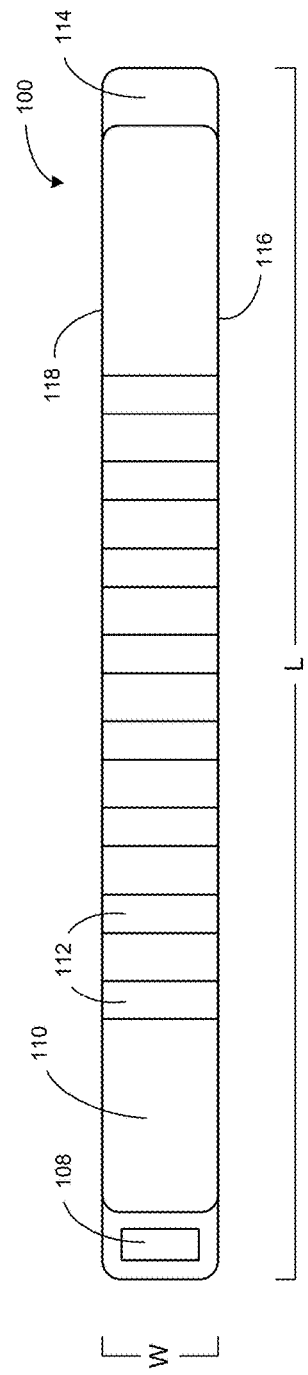

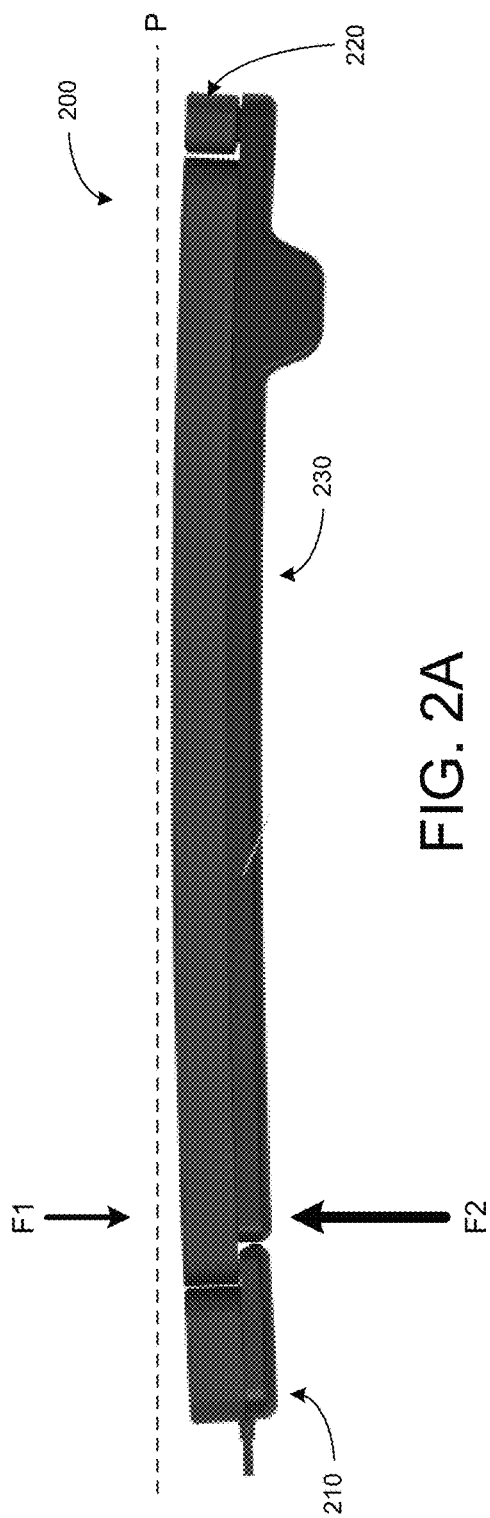
FIG. 2A
FIG. 2B

ILLUMINATION APPARATUS

BACKGROUND

Lighting devices, lamps, or illuminatable devices can come in a variety of shapes and sizes. Such lighting devices are typically used by a user to provide illumination in various environments.

BRIEF DESCRIPTION OF THE DRAWINGS

FIG. 1A illustrates a side view of an example housing structure of an illumination apparatus, according to an embodiment.

FIG. 1B illustrates a top view of an example housing structure of an illumination apparatus, according to an embodiment.

FIGS. 2A and 2B illustrate a side view an example illumination apparatus, in one embodiment.

DETAILED DESCRIPTION

Figure 1C:
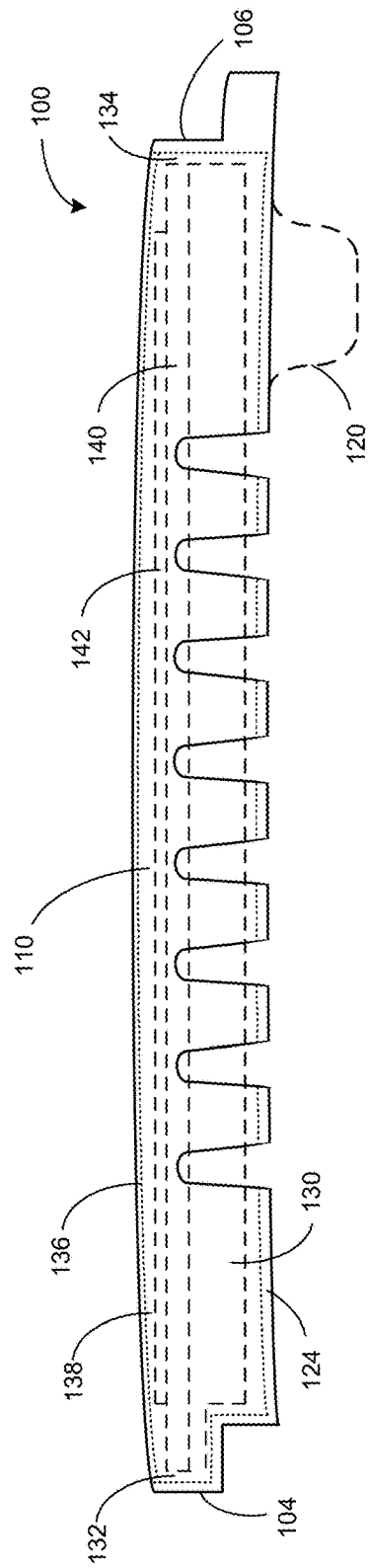
FIG. 1C illustrates a side view of the example housing structure of FIG. 1A housing a plurality of components, in an embodiment.

Examples described herein provide an illumination apparatus that is structured to contour to (or snugly fit on) a variety of differently curved surfaces, such as on a surface of a vehicle windshield. In some examples, the illumination apparatus can include a plurality of components that are contained in a housing structure that is shaped to have a slight curvature along its length. The housing structure can be formed to further include a set of features to facilitate at least a slight flexing of the illumination apparatus. This slight flexing can enable the illumination apparatus to increase or decrease the amount or the degree of curvature along its length.

According to some examples, the illumination apparatus can include a housing structure having an overall width and an overall length. In one or more implementations, the overall length can be substantially greater than the overall width (e.g., the overall length is two or more times larger than the overall width). The housing structure can be shaped to include a cavity to house a set of illumination components of the illumination apparatus. The cavity can be defined by at least a first lateral wall of the housing structure and a second lateral wall of the housing structure, and a base of the housing structure. The housing structure can further include a set of openings on the base, where each opening extends from the first lateral wall to the second lateral wall. In one example, in the case of three or more openings, the set of openings, can be uniformly distributed on at least a portion of the base, such that a spacing between any two adjacent openings on the base is uniform (or substantially equal) in size. As described herein, "substantially equal" or "substantially uniform" means at least nearly a stated amount or quantity, or at least 90% of a stated quantity or expression.

The illumination apparatus can also include a housing over-mold that at least partially encloses the housing structure, such that the housing over-mold encloses or covers at least portions of the first and second lateral walls and the base of the housing structure. In one implementation, the housing over-mold can shield the internal components of the illumination apparatus from being exposed to environmental conditions (e.g., dirt, water, etc.) as a result of the set of openings on the housing structure. In some examples, the housing structure can be inserted into and/or coupled to the housing over-mold so that the housing structure and the housing over-mold can be assembled or disassembled. Alternatively, in another example, the housing structure and the housing over-mold can be molded together to form a unitary housing body (e.g., molded together during a manufacturing process of the housing body). In such an example, the thickness of the lateral walls of the housing body can vary in size at various parts along the length of the housing body. In addition, the combination of the housing structure and/or the housing over-mold enables the illumination apparatus to behave as a spring-loaded structure, in which the illumination apparatus can flex (e.g., increase the amount of curvature along its length) when force is applied to an end of the illumination apparatus and can revert back or flex naturally back to its normal shape at rest when force is removed.

Still further, the illumination apparatus can include a heat sink and a circuit board that are positioned in the cavity of the housing structure. The heat sink can provide a mechanism to dissipate heat that is generated by the circuit board (and/or the set of illumination components) within the illumination apparatus. The heat sink can be formed of metal and be structured to be rigid, e.g., as compared to the housing structure. The circuit board can be mounted on the heat sink and can also be held rigid by the heat sink. In some examples, the heat sink can be structured to have a length that is less than but substantially equal to the length of the cavity, and can be positioned in the cavity such that a small gap is present between at least one end of the heat sink and the corresponding end of the cavity. In this manner, the structure and position of the heat sink within the housing structure enables the illumination apparatus to slightly flex only a certain extent or degree, so as to also prevent the circuit board and the set of illumination components from being bent and damaged, while enabling the illumination apparatus to contour to a surface.

In addition, some examples recognize that different vehicles have differently curved/shaped windshields or windows. For example, depending on the country in which a vehicle is made available or depending on the type or manufacturer of the vehicle, certain vehicles may have windows or windshields having differently curved shapes, i.e., some may be more curved or less curved than others. This may be a result of regulations or safety rules, or a result of aesthetic design purposes, etc. Among other benefits and technical effect, the structure of the illumination apparatus, such as described herein, can enable the illumination apparatus to be contoured to a variety of differently curved windshields when coupled to or fixed to the inner surface of a windshield. For example, one benefit of the illumination apparatus contouring to the surface is that no light or very little light will leak out of the side of the illumination apparatus, which may be distracting to the driver. Still further, the spring action of the illumination apparatus provides the ability to form/contour to the windshield, and then revert back to its original shape after being removed. Additionally, by being structured to have an elongated shape, the illumination apparatus can provide a large surface area for illuminating light or for displaying content, while maximizing the field of vision for the driver and/or the passenger. For example, such an illumination apparatus can be positioned near or adjacent to (e.g., abut) a peripheral edge on the windshield of the vehicle so as to not obstruct or hinder the field of vision.

Housing Structure

FIG. 1A illustrates a side view of an example housing structure of an illumination apparatus, while FIG. 1B illustrates a top view of an example housing structure of an illumination apparatus, according to examples. A housing skeleton or structure 100 is defined by a base 102, a first peripheral side 104, a second peripheral side 106, a first lateral wall 116, and a second lateral wall 118. In some examples, the housing structure 100 can be structured to have an overall length, L, an overall height, H, and an overall width, W. The overall length, L, can be substantially larger (e.g., 2 or more times larger) than the overall width, W, and the overall height, H. As illustrated in the example of FIGS. 1A and 1B, the overall length, L, can be more than six or seven times larger than the overall width, W. Although not shown in FIGS. 1A and 1B for purposes of simplicity, each of the base 102, the peripheral sides 104, 106, and the lateral walls 116, 118, can have a thickness that is uniform in size or varies in size.

According to examples herein, the housing structure 100 is formed to have a slight curve along its overall length, L, such that the housing structure 100 is curved at rest (e.g., when no force is applied to either ends of the housing structure 100). For example, the slight curvature of the housing structure 100 is illustrated in FIG. 1A with respect to a plane, P. With respect to the plane, P, the housing structure 100 is shaped as an arc with the first end 105 and the second end 107 curving downward away from the plane, P. The amount or degree of curvature can vary depending on implementation. In one example, the curvature of the housing structure 100 can match or correspond to an average curvature of a windshield, e.g., such that the first end 105 and the second end 107 each curve downwards approximately four millimeters as compared to the middle portion 109 of the housing structure 100.

The housing structure 100 can also be structured to include a cavity 110 that can house a set of components of the illumination apparatus (not shown in FIGS. 1A and 1B). The cavity 110 can be defined by the base 102, the first peripheral side 104, the second peripheral side 106, the first lateral wall 116, and the second lateral wall 118. The housing structure 100 can also include a set of openings 112, which are distributed on the base 102. Each of the openings 112 can also extend from the first lateral wall 116 to the second lateral wall 118. Depending on implementation, the openings 112 can have different shapes. In the example of FIGS. 1A and 1B, the openings 112 can be rectangular shaped on the base 102 and can taper up from the base 102 as it extends away from the base 102 on the first and second lateral walls 116, 118. Still further, while the openings 112 taper into a curve on the lateral walls 116, 118, such as in the example of FIG. 1A, in other examples, the openings 112 can taper into other shapes, e.g., a triangular shape.

Still further, although eight openings 112 are illustrated in FIGS. 1A and 1B, in alternative implementations, a different number of openings 112 may be included in the housing structure 100. In one example, there may be a single opening near or at the middle portion 109 of the housing structure 100, while in another example, there may be two or more, or even more than eight. The number of openings 112 can affect the manner in which the illumination apparatus can flex. For example, when the housing structure 100 has a single opening 112 near the middle portion 109 of the housing structure 100, the illumination apparatus can flex very little along the overall length, L, of the housing structure 100, as compared to when a larger number of openings 112 are present in the housing structure (e.g., four or more, etc.). Additionally, when a large number of openings 112 are included in the housing structure 100, the illumination apparatus can flex more uniformly or evenly along the overall length, L, of the housing structure 100. The size of the openings 112 can also vary depending on implementation.

In some examples, the housing structure 100 can be shaped to have a protrusion on the first end 105 that is raised as compared to the base 102, and a platform 114 on the second end 107 that extends outwards from the base 102. The protrusion and the platform 114 can provide a structure to enable the illumination apparatus to couple to a first housing structure and a second housing structure, respectively (not illustrated in FIGS. 1A and 1B). The first housing structure and/or the second housing structure can enable the illumination apparatus to couple to a surface, such as a window or windshield. The protrusion can also include one or more openings 108, in which one or more electrical contacts (or a connector) that is coupled to a circuit board can extend through in order to mate to or couple to a corresponding one or more electrical contacts (or corresponding connector) provided on the first housing structure. In alternative implementations, the housing structure 100 can be shaped to have two protrusions on each end or two platforms on each end, or no protrusions, and other types of fastening or coupling mechanisms can be used to enable the illumination apparatus to couple to the first and second housing structures. Still further, in one example, the housing structure 100 can include a handle 120 that extends away from the base, such as illustrated in FIG. 1A.

Depending on implementation, the housing structure 100 can be formed of one or more semi-flexible materials. For example, the housing structure 100 can be formed of a plastic material, such as thermoplastic polymer (e.g., acrylonitrile butadiene styrene (ABS) or polycarbonate (PC), and/or another material that provides some degree of rigidity. This material allows the housing structure 100 to maintain a general structure, while also allowing the housing structure 100 to flex in desired directions. The combination of the material of the housing structure 100 and the structure of the openings 112 (and/or the thicknesses the base 102, the peripheral sides 104, 106, and the lateral walls 116, 118) can enable the illumination apparatus to flex such that the degree or amount of curvature can increase or decrease when force is applied on at least one of the first end 105 or the second end 107. For example, if the illumination apparatus flexes to increase the amount of curvature (e.g., be more curved than at rest), the housing structure 100 can compress slightly as the openings 112 move slightly closer together.

According to some examples, the illumination apparatus can also be structured to only flex to a certain extent. Because the cavity 110 of the housing structure 100 houses a set of components, including a set of illumination components and a circuit board (e.g., a printed circuit board (PCB)), for example, severe flexing of the illumination apparatus may damage the electrical components. In some examples, the size (e.g., the dimensions) and the position of a heat sink in the cavity 110 can provide mechanism to prevent the severe flexing of the illumination apparatus.

For example, FIG. 1C illustrates a side view of the example housing structure of FIG. 1A storing a plurality of components, including a heat sink 130 and a circuit board 140, in the cavity 110. According to examples, a set of illumination components 142 (or alternatively, a display device) can be coupled to or mounted on the circuit board 140, and the circuit board 140 can be coupled to or mounted on the heat sink 130. For illustrative purposes, FIG. 1C depicts a thickness 124 of the base 102, the first peripheral side 104, and the second peripheral side 106. The heat sink 130 can have a length that is slightly less than but substantially equal to the length of the cavity, such that a first peripheral gap 132 and/or a second peripheral gap 134 exists between the heat sink 130 and the first peripheral side 104 and/or the second peripheral side, respectively. Similarly, a gap 138 can exist between the set of illumination components 142 and a lens 136 or diffusion layer/cover. The gaps 132, 134, 138 can be very small in size, such as two or four millimeters, etc., which can provide a margin of movement between the heat sink 130 and the cavity 110 for the illumination apparatus to flex. In this manner, the heat sink 140 can provide rigidity for the illumination apparatus to prevent severe flexing, while also providing a mechanism to dissipate heat that is generated by the circuit board 140.

Illumination Apparatus

Figure 1D:
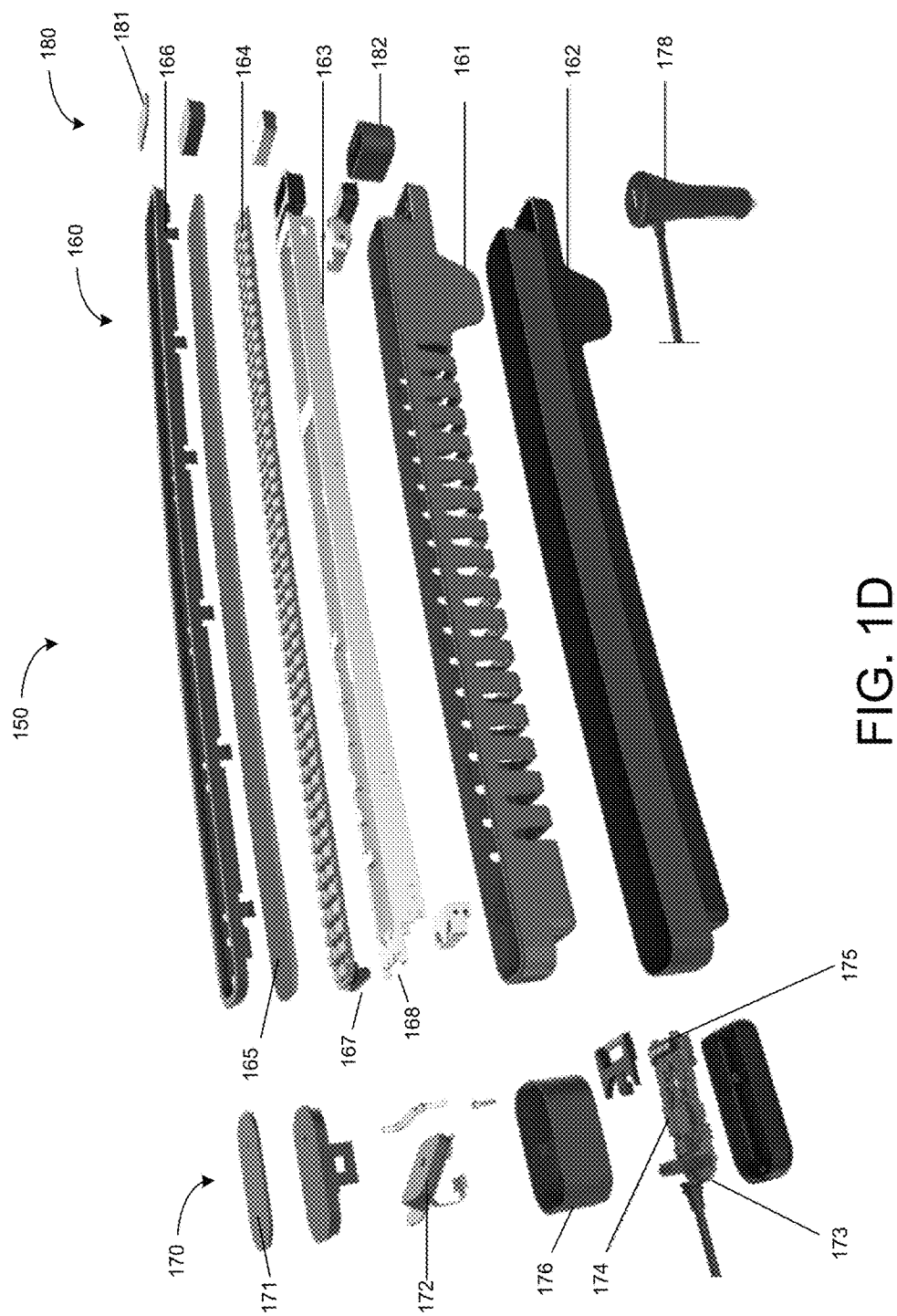
FIG. 1D illustrates an exploded view of an example illumination apparatus, in one embodiment.

FIG. 1D illustrates an exploded view of an example illumination apparatus, in one embodiment. According to an example, an illumination apparatus 150 can comprise three housing structures: a first housing structure 170, a second housing structure 180, and a main housing structure 160. In other examples, however, the illumination apparatus 150 can be formed of a single housing or two housings.

The main housing structure 160 can include a housing structure 161, such as the housing structure 100 described in FIGS. 1A through 1C. As illustrated in the example of FIG. 1D, the housing structure 161 can include a cavity that is defined by a first lateral wall, a second lateral wall, and a base. The housing structure 161, in this example, includes a set of openings (e.g., seventeen openings) that are distributed uniformly along the length of the base, where each opening extends from the first lateral wall to the second lateral wall. The main housing structure 160 can also include a housing over-mold 162 which can at least partially enclose the housing structure 161. Depending on implementation, the housing structure 161 can be inserted into the housing over-mold 162 and fastened into place, or alternatively, can be molded together with the housing over-mold 162 to form a housing body (e.g., a unitary housing body that is formed during the manufacture process).

In one example, the housing over-mold 162 can be formed of a material that provides some degree of elasticity or flexibility. For example, the housing over-mold 162 can be formed of a rubber-like material or a semi-flexible plastic material, such as thermoplastic urethane or thermoplastic polyurethane (TPU), or other types of polyurethane plastics. The housing structure 161 and/or the housing over-mold 162 can be shaped to have a slight curvature along its length at rest, and can be structured to flex, such as described with FIGS. 1A through 1C. Still further, the structure and materials of the housing structure 161 and/or the housing over-mold 162 can enable to behave as a spring-loaded structure.

The main housing structure 160 can also include a heat sink 163 that is positioned within the cavity of the housing structure 161. The heat sink 163 can be formed of a metallic material to dissipate heat that is generated by the circuit board 164. For example, when the illumination apparatus 150 is powered on or in use (e.g., providing illumination, outputting light, etc.), the components provided on the circuit board 164 can generate an immense amount of heat. If the circuit board 164 were to overheat, various electronic components or circuitry can be damaged, thereby reducing the operability of the illumination apparatus 150 (e.g., one or more illumination components can be damaged) or entirely rendering the illumination apparatus 150 inoperable. The circuit board 164 can be coupled to the heat sink 163 so that the heat that is generated by the circuit board 164 can be dissipated by the heat sink 163 within the main housing structure 160.

Depending on implementation, the heat sink 163 can be inserted into the cavity of the housing structure 161 and engaged to one or more fastening mechanisms within the cavity to couple to the housing structure 161. The fastening mechanism(s) can secure the heat sink 163 (and the circuit board 164) in place, but still allow for the illumination apparatus 150 to partially flex. For example, the heat sink 163 can have one or more holes or slots in which one or more pins of the housing structure 161 can be inserted into. The slot(s) can be dimensioned to be larger in size as compared to the pin(s) to enable the pin to slightly shift or move within the slot(s) when the housing structure 161 is flexed. In this manner, the heat sink 163 can be secured in the housing structure 161, but enable the lateral walls and the base to slightly move with respect to the heat sink 163. In other examples, other fastening mechanisms can be used within the cavity, such as a rail and an arm that engages with the rail. As an addition or an alternative, the heat sink 163 can be held in place by having a width that is substantially equal to the width of the cavity so that the heat sink 163 is tightly fit within the cavity. As described with FIG. 1C, while one or more peripheral gaps may exist between the end(s) of the heat sink 163 and the cavity to allow for flexing, by structuring the heat sink 163 to have the substantially same width as the cavity, the illumination apparatus 150 will be prevented from being flexed from side to side (and can be flexed only up and down).

In some examples, such as illustrated in FIG. 1D, the circuit board 164 can be dimensioned to have a width and a length that is substantially equal to the width and the length of the cavity, respectively. In other examples, the dimensions of the circuit board 164 can be less than the dimensions of the cavity. The circuit board 164 can be a PCB, for example, with a plurality of components that are mounted on or coupled to the surface(s) of the PCB, including a set of illumination components, one or more drivers, and/or other circuitry. As described herein, a set of illumination components can correspond to one or more individual light sources, such as light-emitting diodes (LEDs) or electroluminescence (EL) elements, one or more display components (LED display or liquid crystal display, etc.), or a combination of different light devices or displays. In the example of FIG. 1D, the set of illumination components corresponds to an array of LEDs that are provided on a first surface of the circuit board 164, such that when the illumination apparatus 150 is in use, light can be outputted in a direction away from the base of the housing structure 161.

Still further, in one example, the circuit board 164 can also include an interface with a set of contacts 167 or a connector that can couple to or mate with another corresponding set of contacts or connector. The illumination apparatus 150 of FIG. 1D, for example, can couple to the set of contacts 175 or connector of the first housing structure 170 to receive power. The interface can be coupled to the second surface (opposite the first surface) of the circuit board 164, such that the set of contacts 167 is positioned near or at the first end of the housing structure 161 when the circuit board 164 and the heat sink 163 are engaged with the housing structure 161. When the main housing structure 160 is assembled together, the set of contacts 167 can be extended through the set of openings of the housing structure 161 (e.g., such as the openings 108 illustrated in FIG. 1B). The first end of the heat sink 163 can be structured to have a gap 168 or a slot to allow for the set of contacts 167 to be exposed on the protrusion of the first end of the housing structure 161 and the housing over-mold 162.

The main housing structure 160 can also include a lens 165 or diffusion lens or layer/cover that overlays the set of illumination components. In one example, the lens 165 can diffuse the light that is outputted by the set of illumination components. The lens 165 enables the illumination apparatus 150 to output a softer, unitary light as opposed to light that appears to be outputted by individual LEDs, for example. The lens 165 can also act as the cover to house and protect the electrical components on the circuit board 164. Still further, according to an example, the lens 165 can be held in place by a gasket 166 that at least partially encloses the perimeter of the lens 165 and that fastens to the housing structure 161 and/or the housing over-mold 162. For example, the gasket 166 can include a set of clasps that is unitarily formed (e.g., during manufacture) to extend from the gasket 166 and that engages with the cavity of the housing structure 161.

As described in FIG. 1D, in one example, the illumination apparatus 150 can comprise three housings. The main housing structure 160 can couple to the first housing structure 170, which can provide power to and/or control the set of illumination components on the circuit board 164. The first housing structure 170 can include a housing 176 that contains a set of electrical components 174 that are coupled to a circuit board 173 and a global positioning system (GPS) receiver 172 to determine location data of the illumination apparatus 150. The set of electrical components 174 can include a set of sensors (such as an inertial measurement unit (IMU), an accelerometer(s), an altimeter, light sensors/detectors, etc.), power and/or data circuitry (e.g., including a controller), driver(s), a wireless communication component (e.g., a Bluetooth device or a Wi-Fi device, etc.), and/or other circuits. The set of electrical components 174 can receive power from a power interface that is coupled to a cable, which can be connected to a power adapter 178, to provide power and data controls to the circuit board 164 via the mated contacts 167, 175. The power adapter 178, in one example, can be a power adapter 178 for a vehicle socket (e.g., a 12V socket adapter) that is used in a vehicle. In one example, the first housing structure 170 can further include one or more batteries that can be charged using a power interface (e.g., a universal serial bus (USB) interface or a micro-USB interface, etc.).

The first housing structure 170 can also include a first coupling mechanism 171 that is provided on an upper surface of the first housing structure 170. The first coupling mechanism 171 can correspond to an adhesive layer (e.g., including a sticky material, such as tape, glue) or a suction cup(s) that enables the first housing structure 170 to couple to or fasten to a surface. As described in examples herein, the surface can correspond to a surface of a window or a windshield. In some examples, the first coupling mechanism 171 can include a semi-permanent adhesive tape that allows for the first housing structure 170 to be semi-permanently fixed to a surface. Similarly, the second housing structure 180 can also include a second coupling mechanism 181, which is similar to the first coupling mechanism 171, that is provided on the upper surface of the second housing structure 182 to couple to or fasten to a surface.

Each of the first housing structure 170 and the second housing structure 180 can further couple to and decouple from the respective ends of the main housing structure 160 (e.g., see FIGS. 2A and 2B, for example) using one or more coupling mechanisms. Such coupling mechanisms can include fastening clips or magnetic components. In this manner, while the first and second housing structures 170, 180 are attached or fixed to a surface, such as the inner surface of the windshield, a user can couple and decouple the main housing structure 160 from the first housing structure 170 so as to attach or remove main housing structure 160 from the surface. For example, a user of the illumination apparatus 150 can be a driver of a vehicle who provides transport services for requesting riders. The illumination apparatus 150 can be positioned on the windshield to be easily visible to a rider that is outside of the vehicle, to indicate to the rider which vehicle to enter. When the user is no longer providing services or driving the user can easily remove the main housing structure 160 for safekeeping, for example, or can easily attach the main housing structure 160 when he or she wants to use it.

As an alternative, in an example in which the illumination apparatus 150 is formed from one main housing structure, the components of the first housing structure 170 can be included in the main housing structure. In such an example, the sensors, the controller, and the power circuitry, etc., can be included in the main housing structure and the contacts 167, 175 would not be necessary. Still further, in this example, the gasket 166 (and/or the main housing structure 160, in general) can include one or more coupling mechanisms to couple the illumination apparatus 150 to a surface of a window or windshield.

Figure 1E:
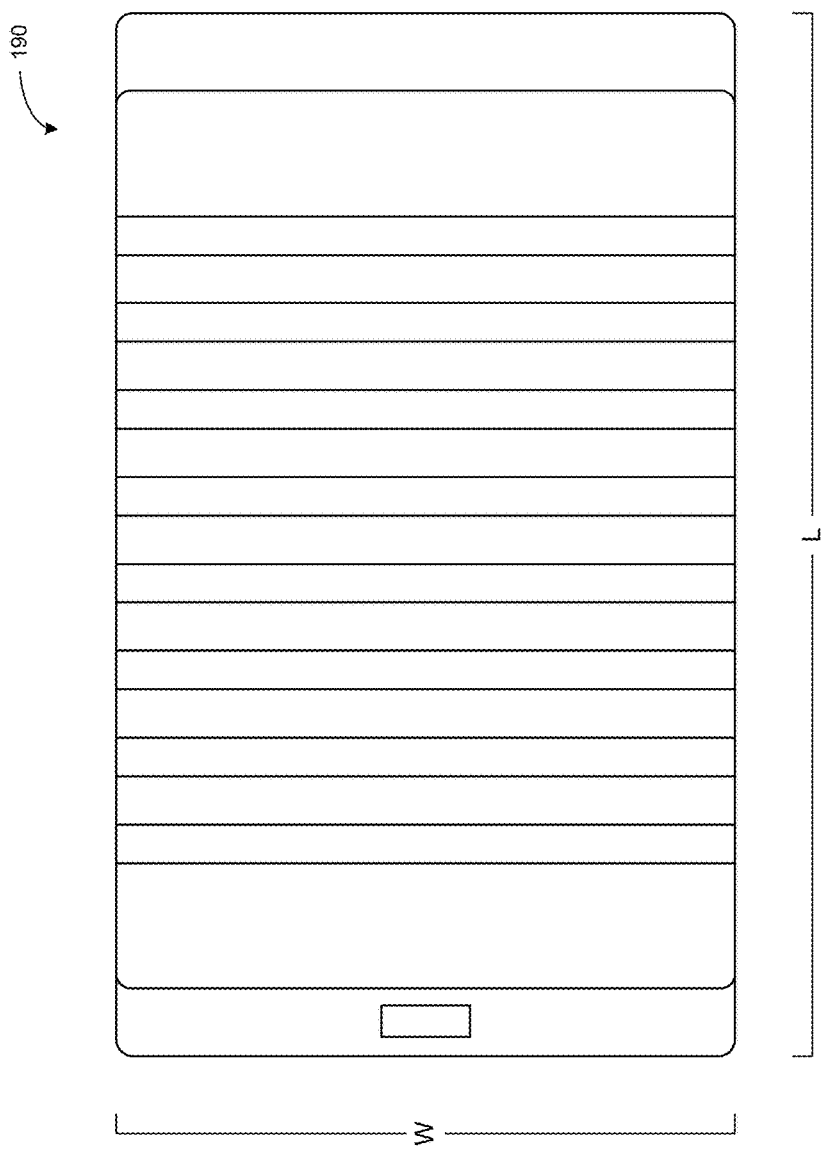
FIG. 1E illustrates an example illumination apparatus, according to one or more embodiments.

Still further, while examples described herein provide an illumination apparatus having an elongated shape (e.g., having a length that is substantially larger than a width), in some implementations, the illumination apparatus can have a different shape, in which the length is not substantially larger than the width. For instance, in one example, the housing skeleton or structure 190 can have a length that is less than or equal to the width, or a length that is larger than the width, but less than two times larger than the width, such as illustrated in a top view of the housing structure 190 in FIG. 1E. The housing structure 190 in FIG. 1E can also be shaped to be curved along its length, such as the housing structure 100 in FIG. 1A. In such an example, the housing structure 190 can be shaped and/or be enclosed or molded with a housing over-mold (not shown in FIG. 1E) to enable the illumination apparatus to contour to a curved surface. The housing structure 190 can have a base with a set of openings that each extends from one lateral wall to the other lateral wall and a cavity that is defined by the base and the lateral walls, such as illustrated in FIG. 1E.

Figure 2C:
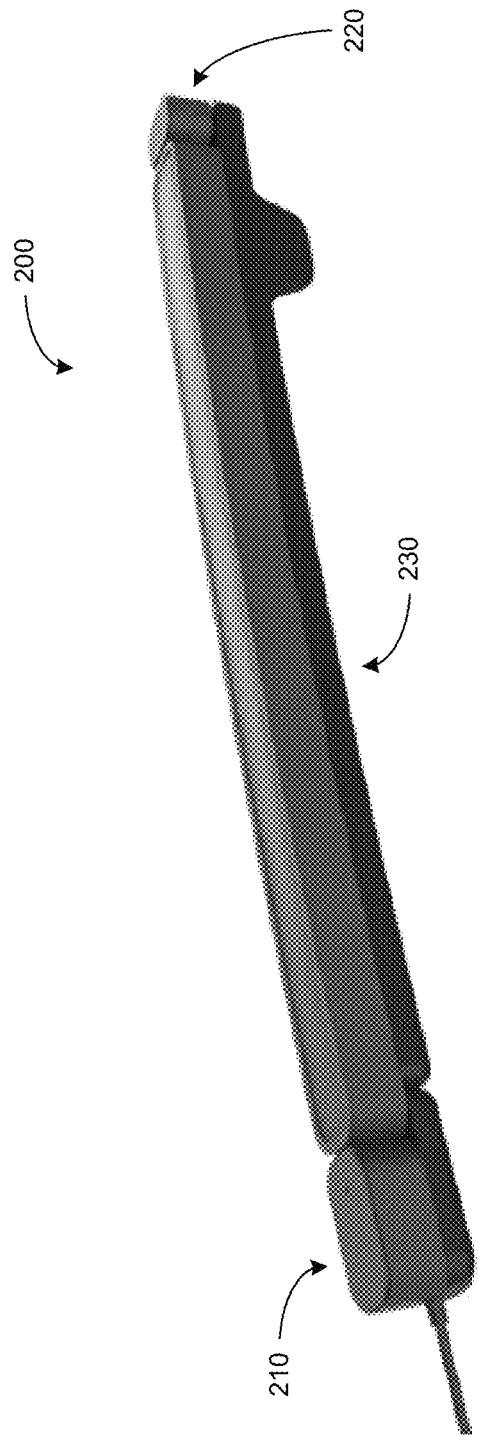
FIG. 2C illustrates a perspective view of an example illumination apparatus, according to an embodiment.

FIGS. 2A and 2B illustrate a side view an example illumination apparatus, according to some examples. FIG. 2C illustrates a perspective view of an example illumination apparatus. FIGS. 2A and 2C illustrates the illumination apparatus 200 having a first housing structure 210, a second housing structure 220, and a main housing structure 230, such as respectively illustrated in the example of FIG. 1D. As described with respect to FIGS. 1A through 1D, the main housing structure 230 can include a housing structure to enable the main housing structure 230 to at least slightly flex (e.g., increase or decrease the amount of curvature in the downward direction with respect to the plane, P). The ability to slightly flex can enable the illumination apparatus 200 to contour to curved surfaces having different degrees or amounts of curvature.

In one example, the shape and construction of the housing structure (e.g., such as the housing structure 100 of FIGS. 1A through 1C) can enable the main housing structure 230 to flex more easily in one direction as compared to another direction (or behave as a spring-loaded structure). As shown in FIG. 2A, less force, F1, is necessary to be applied on a first end of the main housing structure 230 in a downward direction toward the base to cause the main housing structure 230 to flex downwards (to curve more in the direction away from the plane, P) as compared to the amount of force, F2, that is necessary to applied on the first end in an upward direction to cause the main housing structure 230 to flex upwards (e.g., to straighten out).

Still further, as illustrated in FIG. 2B, the main housing structure 230 can couple to and decouple from the first housing structure 210 and the second housing structure 220. As described with FIG. 1D, the first housing structure 210 can include a first coupling mechanism 202 to attach the first housing structure 210 to a surface (e.g., an adhesive layer) and a second coupling mechanism 204 to couple to the first end of the main housing structure 230. Similarly, the second housing structure 220 can include a first coupling mechanism 222 to attach the second housing structure 220 to the surface (e.g., an adhesive layer) and a second coupling mechanism 224 to couple to the second end of the main housing structure 230 (e.g., using magnetic components, etc.).

Figures 3A, 3B:
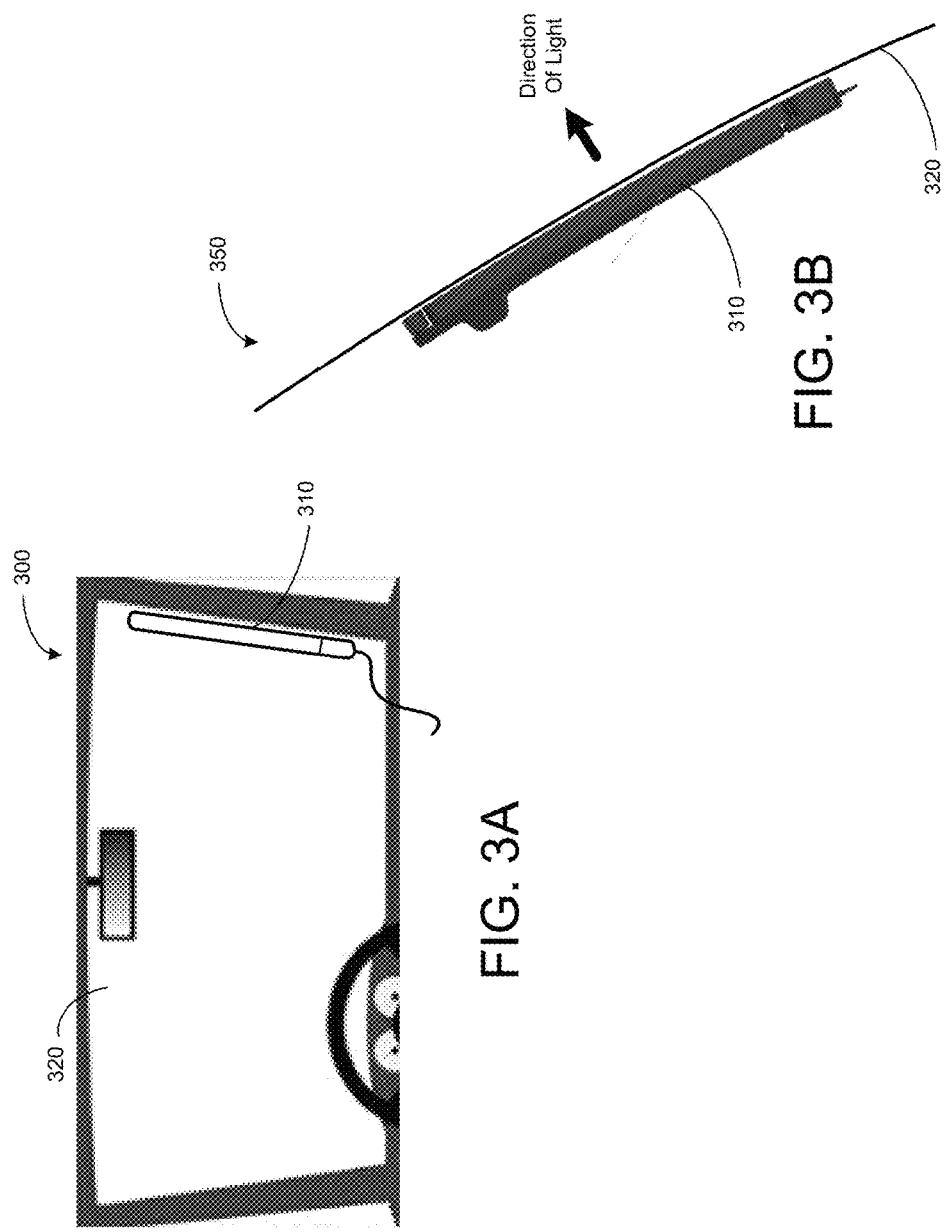
FIGS. 3A and 3B illustrate diagrams of an example illumination apparatus in a particular environment, in one embodiment.

FIGS. 3A and 3B illustrate diagrams of an example illumination apparatus in a particular environment, according to some examples. Referring to FIG. 3A, the diagram 300 depicts the illumination apparatus 310 being coupled to a windshield 320. The illumination apparatus 310 can be shaped to have a length that is substantially larger than its width so as to maximize the size of the surface in which light is outputted (while also maximizing the field of view of the driver). In the diagram 300, the illumination apparatus 310 can be coupled to a peripheral edge of the windshield 320 (e.g., the right, passenger side) so as to not interfere with the vision of the driver. In addition, as a result of the shape and construction of the main housing structure, the illumination apparatus 310 can be curved and can slightly flex to contour to the curved interior surface of the windshield 320, such as illustrated in the side view diagram 350 of FIG. 3B. When the driver wishes to put the illumination apparatus 310 away for safekeeping (when not in use), the driver can reach over and grab the handle, for example, and pull downwards to first decouple the main housing structure from the second housing structure (positioned near the top of the windshield) and then decouple the main housing structure from the first housing structure (positioned near the bottom of the windshield).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. An illumination apparatus, comprising:
   a set of illumination components;
   a housing structure having an overall width and an overall length, the overall length being substantially greater than the overall width, the housing structure being shaped to include a cavity to house the set of illumination components;
   wherein the cavity is defined by, at least, (i) a first lateral wall of the housing structure and a second lateral wall of the housing structure that each extends along the overall length, and (ii) a base of the housing structure;
   wherein the housing structure includes a set of openings on the base, each opening extending from the first lateral wall to the second lateral wall; and
   a housing over-mold that at least partially encloses the first lateral wall, the second lateral wall, and the base of the housing structure.

2. The illumination apparatus of claim 1, wherein the housing over-mold is molded together with the housing structure to form a housing body.

3. The illumination apparatus of claim 2, wherein the set of openings includes three or more openings, and wherein the set of openings are uniformly distributed on at least a portion of the base such that a spacing between any two adjacent openings on the base is uniform in size.

4. The illumination apparatus of claim 3, wherein the housing body is shaped as an arc such that a first end and a second end of the housing body curves downwards relative to a plane that is tangent to a middle portion of the housing body, and wherein the housing body is structured to be more flexible when force is applied on one of the first end or the second end in a downwards direction away from the plane as compared to when force is applied on one of the first end or the second end in an upwards direction towards the plane.

5. The illumination apparatus of claim 1, further comprising:
   a heat sink that is positioned in the cavity of the housing structure; and
   a circuit board that is coupled to the heat sink and is positioned in the cavity of the housing structure;
   wherein the heat sink is dimensioned to have a length that is less than but substantially equal to a length of the cavity.

6. The illumination apparatus of claim 5, wherein the set of illumination components is coupled to or mounted on the circuit board, the set of illumination components being positioned to output light in a direction away from the base of the housing structure.

7. The illumination apparatus of claim 6, further comprising:
   a cover or a lens to cover the cavity of the housing structure; and
   an enclosure mechanism to fasten the cover or the lens to the housing structure.

8. The illumination apparatus of claim 5, wherein the housing structure has a first end and a second end, the first end including one or more openings, and wherein the circuit board is coupled to one or more contacts that extend out of the one or more openings when the circuit board is positioned in the cavity of the housing structure.

9. The illumination apparatus of claim 8, further comprising:

a fastening device to couple the illumination apparatus to a surface;

wherein the second end of the housing structure is dimensioned to provide a protrusion that extends from the base of the housing structure, and wherein the protrusion couples to the fastening device using a fastening mechanism.

10. An illumination apparatus, comprising:

a first housing structure;

a second housing structure; and a third housing structure that couples to the first housing structure and the second housing structure, wherein the third housing structure includes:

(i) a set of illumination components;

(ii) a flexible frame that has an overall width and an overall length, the overall length being substantially greater than the overall width, the flexible frame being shaped to include a cavity to house the set of illumination components;

wherein the cavity is defined by, at least, (i) a first lateral wall of the flexible frame and a second lateral wall of the flexible frame that each extends along the overall length, and (ii) a base of the flexible frame;

wherein the flexible frame includes a set of openings on the base, each opening extending from the first lateral wall to the second lateral wall; and (iii) a housing over-mold that at least partially encloses the first lateral wall, the second lateral wall, and the base of the flexible frame.

11. The illumination apparatus of claim 10, wherein the housing over-mold is molded together with the flexible frame to form the third housing structure.

12. The illumination apparatus of claim 11, wherein the set of openings includes three or more openings, and wherein the set of openings are uniformly distributed on at least a portion of the base such that a spacing between any two adjacent openings on the base is uniform in size.

13. The illumination apparatus of claim 12, wherein the third housing structure further includes:

a heat sink that is positioned in the cavity of the flexible frame; and a circuit board that is coupled to the heat sink and is positioned in the cavity of the flexible frame;

wherein the heat sink and the circuit board are each dimensioned to have a respective length that is less than but substantially equal to a length of the cavity.

14. The illumination apparatus of claim 13, wherein the set of illumination components is coupled to or mounted on the circuit board, the set of illumination components being positioned to output light in a direction away from the base of the flexible frame.

15. The illumination apparatus of claim 14, wherein the first housing structure includes:

a power interface;

a first connector; and wherein the third housing structure includes a second connector to mate with the first connector, wherein the power interface is to provide power to the circuit board via the first and second connectors.

16. The illumination apparatus of claim 14, wherein the third housing structure includes:

a cover or a lens to cover the cavity of the flexible frame; and an enclosure mechanism to fasten the cover or the lens to the flexible frame.

17. The illumination apparatus of claim 10, wherein the first housing structure includes a first fastening device to couple the first housing structure to a surface, wherein the second housing structure includes a second fastening device to couple the second housing structure to the surface, and wherein the third housing structure is coupleable or decoupleable from the first housing structure and the second housing structure.

18. The illumination apparatus of claim 17, wherein the first housing structure is coupleable to a first peripheral end of the third housing structure, and wherein the second housing structure is coupleable to a second, opposing peripheral end of the third housing structure.

19. An illumination apparatus, comprising:

a set of illumination components;

a housing structure having an overall width and an overall length, the overall length being substantially greater than the overall width, the housing structure being shaped to include a cavity to house the set of illumination components;

wherein the cavity is defined by, at least, (i) a first lateral wall of the housing structure and a second lateral wall of the housing structure that each extends along the overall length, and (ii) a base of the housing structure; and a housing over-mold that at least partially encloses the first lateral wall, the second lateral wall, and the base of the housing structure;

wherein the housing structure includes three or more openings on the base, each opening extending from the first lateral wall to the second lateral wall, and wherein the three or more openings are uniformly distributed on at least a portion of the base such that a spacing between any two adjacent openings on the base is uniform in size.

* * * * *